United States Patent [19]
Skelham

[11] 3,761,562
[45] Sept. 25, 1973

[54] METHOD OF HEAT SETTING FOOTWEAR
[75] Inventor: Ronald Walter Thomas Skelham, Kettering, England
[73] Assignee: The Shoe and Allied Trades Research Association, Kettering, Northamptonshire, England
[22] Filed: Aug. 5, 1970
[21] Appl. No.: 61,323

[30] Foreign Application Priority Data
Aug. 5, 1969 Great Britain.................. 39,113/69

[52] U.S. Cl................................ 264/346, 264/348
[51] Int. Cl.............................................. B29c 25/00
[58] Field of Search.................... 264/235, 346, 237, 264/348, 321

[56] References Cited
UNITED STATES PATENTS
3,458,617  7/1969   Isley et al............................ 264/348
3,590,112  6/1971   Civardi .............................. 264/321
3,558,764  1/1971   Isaacson et al. .................... 264/346
3,491,177  1/1970   Johnson.............................. 264/348
3,551,536  12/1970  Guerreiro .......................... 264/346
3,595,836  7/1971   Korneli et al....................... 264/235
3,577,502  5/1971   Selman et al. ...................... 264/346
3,577,497  5/1971   Matsugu et al. .................... 264/235

Primary Examiner—Donald J. Arnold
Assistant Examiner—Gene Auville
Attorney—Lerner, David & Littenberg

[57] ABSTRACT

A method and apparatus for heat setting polymeric components of footwear such as lasted shoe uppers which is characterized in that the material is brought from its hot condition to a handling condition by forced cooling within 1½ minutes; the apparatus comprises an enclosure with radiant heaters and a conveyor so that the articles to be treated are irradiated and subsequently subjected to hot gas trapped in the enclosure and thereafter to forced cooling by water sprays.

7 Claims, 6 Drawing Figures

FIG.I.

METHOD OF HEAT SETTING FOOTWEAR

This invention relates to shoe-making and in particular to the employment in shoe-making of the recently developed so-called poromeric materials. These poromeric materials, such as are now widely available under the trade name "CORFAM," "HITELAC," "ORTIX," "CLARINO," "PORVAIR," are porous, leather-like, synthetic sheet materials comprising a microporous layer of a polyurethane or similar polymeric material. Some materials comprise a non-woven fibrous base layer bonded to the microporous layer and some a further woven fabric interlayer between the microporous and base layers; in such composite materials the bonding agent for the layers is usually polyurethane, or similar polymer, derived from the microporous layer. The microporous layer itself normally comprises at least two zones, analogous to a natural leather, namely an inner zone and an outer grain or finish zone. The poromeric materials are coming increasingly into use in shoe-making, in particular as replacement for leather and other plastics materials in shoe uppers.

While the present invention is generally applicable to all currently available poromeric shoe upper materials, it is particularly suitable for the treatment of that material currently sold under the Registered Trade Mark "PORVAIR," which is an elastomeric, thermoplastic, microporous sheet material free from fibrous reinforcement. It is normally dyed or pigmented at least over one surface.

DESCRIPTION OF THE PRIOR ART

It is well known that even after lasting, the uppers of leather shoes will tend to deform as a result of the natural resilience of the material and its resistance to the shaping treatments and in particular the stretching which takes place during lasting. For this reason shoes are given a setting treatment and the most suitable treatment available is what is called moist heat setting. This consists of subjecting the lasted shoe to a cyclic treatment which may consist for example of steaming for 1½ minutes at 65°C followed by blasting with hot air at 120°C.

Poromeric materials have an even greater tendency to recovery of the earlier shapes than leather. These materials are normally based upon polyurethane in which there is substantial hydrogen bonding present. Thus flexible polyurethanes and similar materials such as polyester and polyester amides which have similar hydrogen bonding in the structure between the polymeric chains or three-dimensional molecules do not exhibit good shape retention and the heat setting treatments available for leather uppers do not in practice produce a good response in poromeric materials.

Polyurethanes are derived from the reaction of polyisocyanates with materials such as polyols containing reactive hydrogen atoms, the NCO groups of the isocyanates being converted into —NHCO— linkages which provide the propensity to hydrogen bonding. During the lasting or forming processes, molecular rearrangement occurs and it is though that this in turn produces stresses in the hydrogen bonds existing in the material as well as in other intro or inter-molecular atomic and molecular forces present in the structure.

I have proposed in an earlier dated British Patent Application a method of heat setting a shaped article of a poromeric material which comprises subjecting the article to dielectric heating followed by cooling, while the material is maintained in the desired shape.

While very successful results may be obtained through dielectric heating as described in the said specification, the method involves the use of expensive dielectric heating apparatus, especially where whole shoes are to be subjected to the treatment, where complex electrodes are required. The present invention provides a process more suited to the mass production of shoes. One of the difficulties associated with the heat setting of poromeric materials is that they require to be heated to a temperature e.g. approaching the critical temperature of the material. At this stage they are not only too hot to handle, but are very easily damaged and marked by contact with the hands or other surfaces, and such marks cannot afterwards be "made good". Furthermore, still the heat setting process is akin to an annealing treament, it has always been felt that slow cooling of the material is necessary. This greatly increases the time cycle of the heat setting treatment and consequently the cost of manufacture as well as the risk of damage. We have now found that these disadvantages can be overcome by introducing a quick forced cooling step at the end of the heat treatment.

SUMMARY OF THE INVENTION

The invention is aimed at overcoming the above disadvantages and providing stress relaxation in poromeric materials by a heat treatment which is designed to produce as far as possible uniform heating throughout the material thereby minimising the likelihood of damage to the surface material which would tend to be produced by external forms of heat application. The treatment is aimed at breaking down the stressed hydrogen bonds so that upon cooling fresh bonds will form in unstressed positions.

According to the invention there is provided a method of heat setting shaped poromeric components of footwear characterised in that immediately after heat treatment and while the components are still at a temperature of 100°C or more and while they continue to be maintained in the desired shape, they are subjected to forced cooling sufficient to bring them to a handling temperature within a period not exceeding 1½ minutes.

The method not only results in adequate heat setting in safety and with reduced cost but unexpected improvements in results have been obtained.

The process allows and preferably involves the use of radiant heat in raising the temperature of the shoe upper material. Radiant heat used alone has never been a satisfactory form of heating for use with leather or artificial leather materials due to the very high temperature gradient produced between the exposed and shadow surfaces of the material. Thus unless the intensity of radiation is reduced to a minimum and the process carried out over an inordinately long period, scorching of the exposed surface or melting, in the case of thermoplastic materials, tends to take place. The preferred method of the present invention involves a cycle of different heating steps followed by a cooling step which can be carried out in relatively cheap apparatus with surprisingly good results.

Thus the preferred method comprises subjecting the article successively to radiant heat, a hot gas atmosphere, and forced cooling, while the material is maintained in the desired shape.

The process produces a rapid heating of the outer layers of the material followed by a period in which the heat is distributed more uniformly throughout the thickness of the material.

The combination of radiant and conductive heating steps employed in this process enables the temperature to be raised throughout the body of the poromeric material to the necessary level, in sufficiently rapid time for a commercially desirable process, notwithstanding the difficulty caused by the cellular-like structure of the poromeric. This difficulty is of course particularly acute with poromeric materials consisting of the microcellular layer only.

However the heat treatment may be conducted in any suitable manner, for example, simply by using a hot gaseous atmosphere or by impingement of the components with a stream of hot gas, if necessary followed by further heating in a still atmosphere of hot gas.

Forced cooling is preferably achieved by directing a spray of cold liquid, in particular water, against the poromeric material, the latent heat of evaporation for the liquid droplets being supplied in part at least by the poromeric material and hence accelerating its cooling. Surprisingly the resulting shoe or upper is hardly if at all wet. Alternatively, a stream of cold gaseous fluid, in particular air, can be directed against the poromeric material for example by means of a fan, and this procedure may be advantageous in certain circumstances.

Preferably the heat treatment is of sufficient intensity and duration to bring the surface temperature of the poromeric material to a temperature approaching but not substantially exceeding the critical temperature (as defined herein) of the poromeric material.

The hot gas, when it follows radiant heating is preferably at a temperature less than the critical temperature (as defined herein) of the poromeric material.

In general it may be said that the surface temperature of the article should preferably be raised e.g., under the radiant heating to an upper limit not exceeding 160°C and more preferably from 130°C to 160°C. A suitable temperature range for subsequent treatment with hot gas is 80°C to 150°C, the optimum temperature being about 100°C, e.g., 90°C to 110°C.

The force cooling is preferably carried out with a stream of air and water spray having a velocity of at least 5 feet per second, 5 to 10 feet per second being a useful range of velocities.

In the preferred process the article to be treated is carried in succession past a plurality of radiant heat sources, through an enclosure containing hot air and past a jet emitting a spray of cold air and water.

Preferably the air in the enclosure is heated by the radiant heat sources, but it could be heated by any other effective means such as additional radiant heaters or an external hot gas generator.

The article is preferably subjected to radiant heating for 3 to 4 minutes, to hot gas for 3 to 5 minutes and to forced cooling for ¼ to 1½ minutes, the total treatment preferably not exceeding 8 minutes.

An apparatus is disclosed for the heat setting of lasted articles of footwear having uppers or upper components of poromeric material comprising a conveyor arranged to receive the said lasted articles, and to convey them in succession past a heat treatment zone comprising means for heating the poromeric material to a heat setting temperature and thereafter, while they are still at a temperature of 100°C or more, past a forced cooling zone comprising means for subjecting the articles to forced cooling sufficient to bring them to a handling temperature within a period not exceeding 1½ minutes.

Preferably the conveyor is arranged to receive the said lasted articles, and to convey them in succession past first, second and third treatment zones, a first treatment zone comprising a plurality of radiant heat emitters arranged in succession at spaced positions from one another and from the conveyor so that collectively they will bring all portions of the uppers of the articles to a uniform temperature not substantially exceeding the critical temperature of the poromeric material, a second treatment zone comprising an enclosure through which the conveyor passes, means being provided for heating the air in the enclosure to a temperature less than the said critical temperature, and a third treatment zone comprising means for force cooling the said articles to a handling temperature.

The preferred apparatus comprises an enclosure, a said conveyor running in a vertical closed loop in said enclosure, the said radiant heat emitters being arranged within the lower part of the enclosure, the upper part of the enclosure forming a hot air trap, an access opening in the enclosure between the first emitter and the hot air trap and an air/water spray nozzle arranged to direct a cooling spray into said enclosure above said access opening.

The emitters conveniently comprise rod elements which extend horizontally and transversely to the plane of the conveyor loop. The emitters adjacent the floor of the enclosure are preferably of higher power than those higher up and adjacent the walls. The minimum distance of the radiant heat emitters, which may be of 1 to 2 KW each should preferably be from 3½ to 6 inches.

An extractor fan is preferably fitted to said hot air trap and operated in dependence upon a thermostat to maintain the hot air temperature within predetermined limits.

Preferably a plurality of spray nozzles are arranged to direct a spray at a pressure of 5 to 10 lbs/sq.in., an air flow of 1½ to 4 cubic feet/min. and water flow of ¼ to 4 pints/hour per nozzle towards the articles.

The preferred process and an embodiment of apparatus in accordance with the invention are hereafter more particularly described with reference to the accompanying drawings in which:

DETAILED DESCRIPTION OF DRAWINGS

Figure 1:
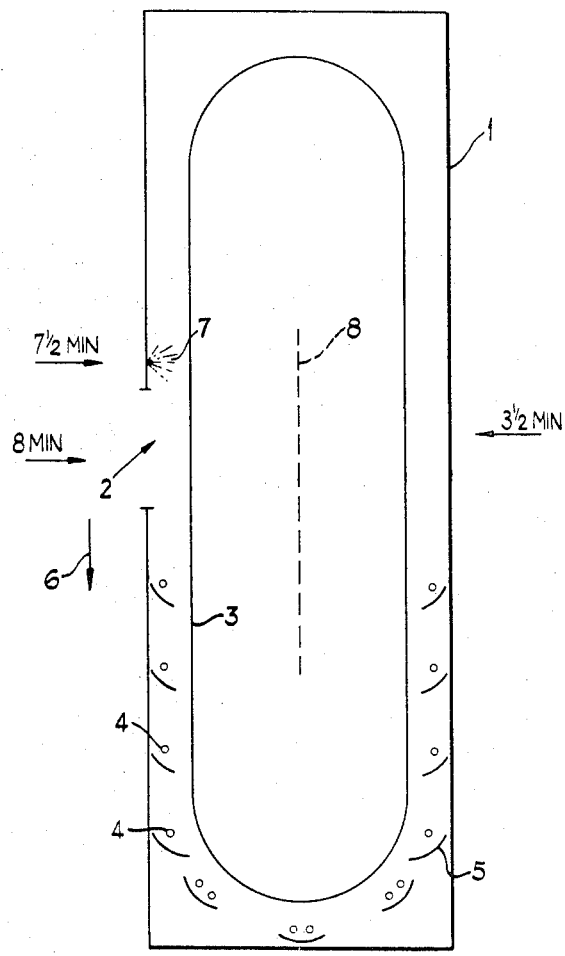
FIG. 1 is a diagrammatic side elevational view of a suitable skeleton apparatus illustrating the process cycle.

Turning to FIG. 1 there is shown a suitable skeleton apparatus for carrying out the process cycle. This consists of an enclosure 1 having an opening 2 through which a shoe or other article to be treated can be fitted by a continuous chain conveyor 3. Radiant heat emitters 4 are arranged in a horseshoe around the lower part of the enclosure and provided with reflectors 5 which direct the radiant heat upwardly and towards the conveyor 3. The part of the enclosure above the opening 2 forms a trap for hot air. The shoe is fitted to the conveyor 3 through the opening 2 and travels downwardly in the direction of the arrow 6 past the radiant heaters so that various parts of the shoe are successively turned more directly towards the heaters 4. The shoe is normally in the inverted position so that the heaters at the bottom radiate over the top of the upper. A partition 8 is positioned centrally between the runs of the conveyor. As shown by the arrow at the right hand side of the drawing, the radiant heat treatment takes about 3½ minutes after which the shoe passes upwardly and then downwardly through the hot air trap to the position of the forced cooling unit indicated at 7, which takes 7½ minutes. The cooling may take ½ minute to bring the shoe in front of the opening 2 for the second time whereupon it is removed.

Figure 2:
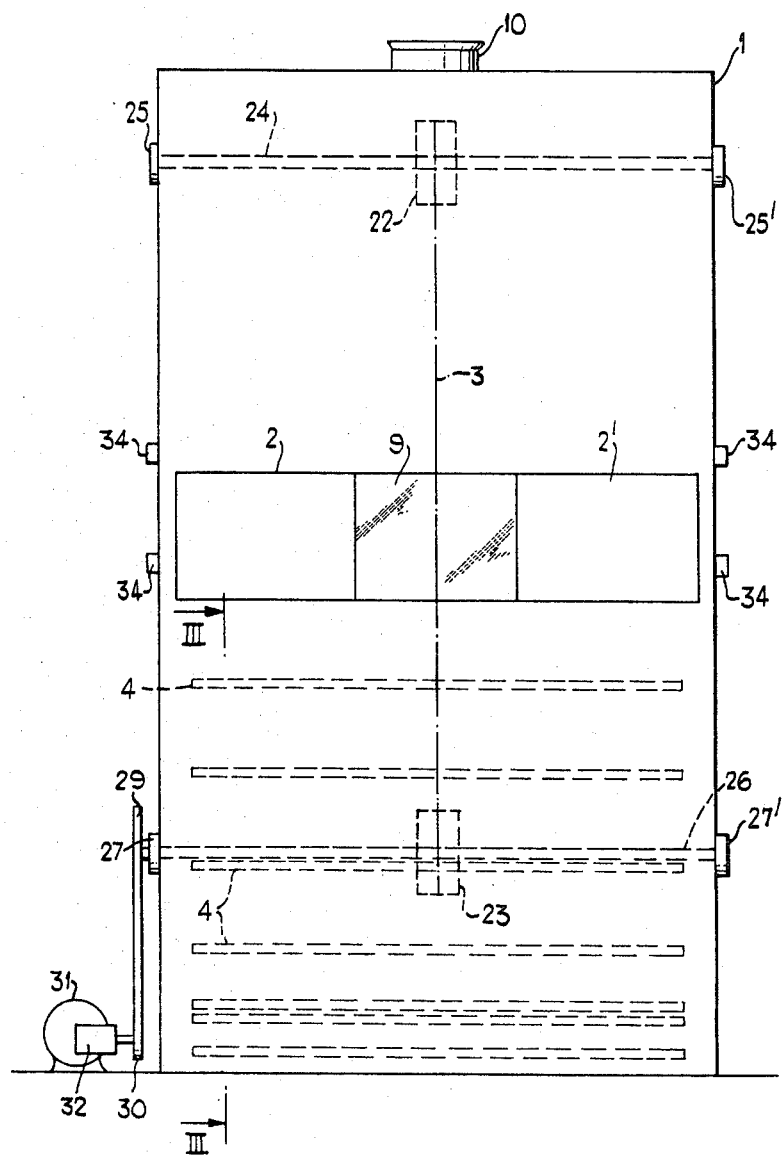
FIG. 2 is a front elevational view of the apparatus.
Figure 3:
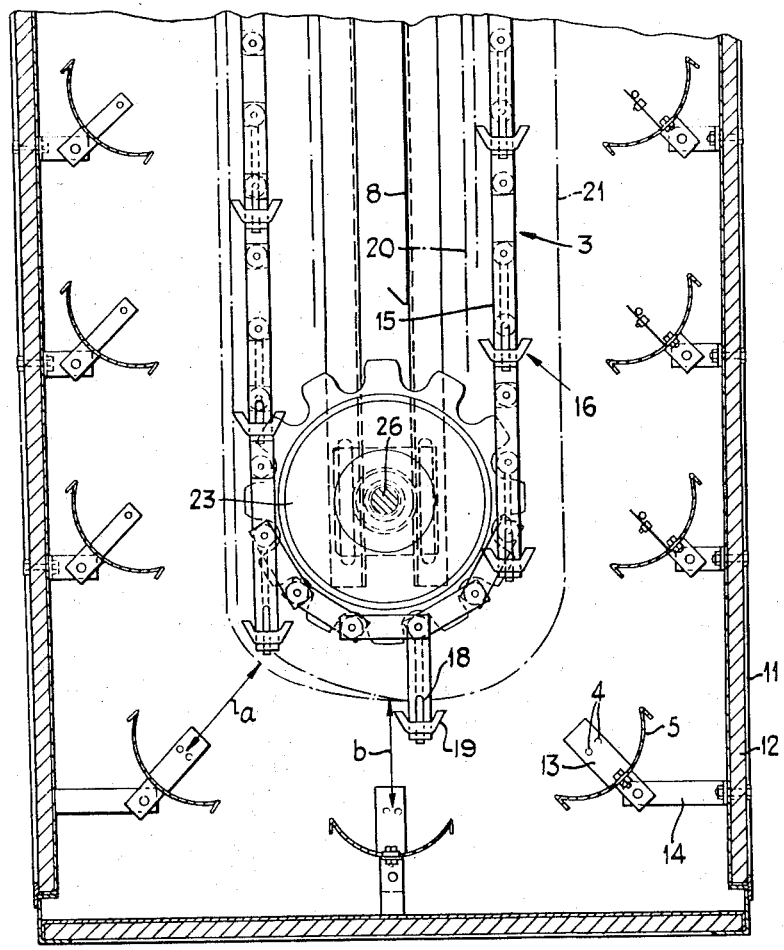
FIG. 3 is a sectional view along the line III—III of FIG. 2.
Figure 4:
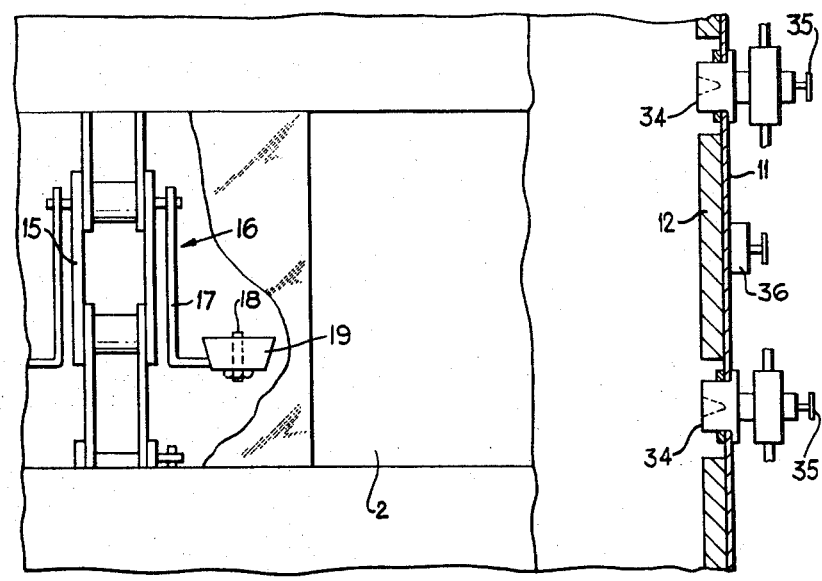
FIG. 4 is an enlarged view of a portion of FIG. 2.

FIGS. 2 to 4 show the apparatus in more detail. In this apparatus the enclosure 1 can be considered as divided into two identical halves served respectively by opposite sides of the centrally situated conveyor 3. Each enclosure half has an opening 2,2', the openings being separated by a glass window 9. The hot air trap at the top of the enclosure 1 is provided with an extractor fan 10 connected in circuit with a thermostat (not shown) to maintain the hot air temperature in the upper part of the enclosure 1 to the desired temperature, normally 100°C.

The radiant heating elements 4, 4' extend across the full width of the enclosure and are shown in greater detail in FIG. 3.

As shown in FIG. 3 the walls of the enclosure 1 are formed of steel sheets 11 lined with insulating material such as asbestos cladding 12. Each heating unit consists of one or more elements 4 supported by end supports 13 pivotally mounted to brackets 14 fitted to the walls or floor. The walls or floor are shielded from the elements by a reflector 5.

Figure 5:
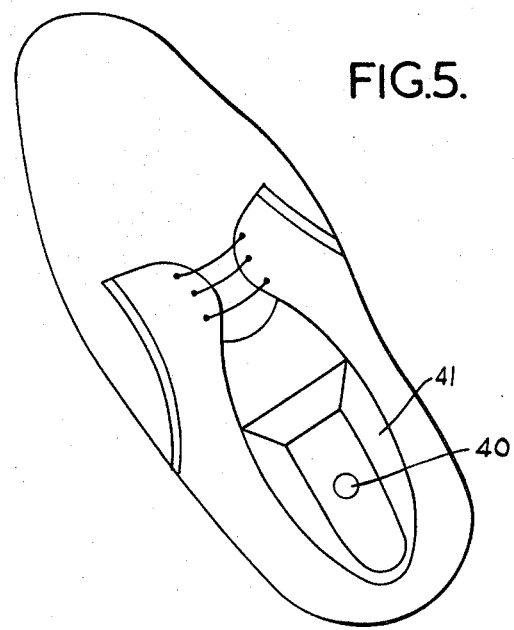
FIG. 5 is a top plan view of a lasted shoe for fitment to the conveyor of the apparatus.

The conveyor chain 3 is composed of links 15 and a shoe support 16, one of which appears in FIG. 4, is attached to every third link axle on each side of the conveyor, so as to pivot therefrom. The shoe support 16 comprises a right-angled bracket 17, one limb of which projects outwardly from the chain as shown in FIG. 4 and has fastened to it a connecting means consisting of an upright pin 18 adapted to fit in a corresponding bore 40 (FIG. 5) in the ankle portion of a last, and a supporting seat member 19 against which the upper sides 41 (FIG. 5) of the ankle portion of the last rest when the last is inverted and fixed in place on the support 16. Since the shoe supports 16 pivot as shown especially in FIG. 3, the shoe is always in the inverted position. In FIG. 3 the chain-dotted lines 20 and 21 indicate respectively the positions of the inside edge and outside edge of a size 7 shoe fitted to the support. The dimensions a, b and c indicate the distances of various radiant heating elements from the adjacent surface of the shoe, the dimension a being for example 5¼ inches, b being for example 4⅝ inches and c being 4 5/16 inches.

The conveyor chain 3 is mounted to a respective upper pulley wheel 22 and lower pulley wheel 23, the wheel 23 being shown in FIG. 3. The upper pulley wheel 22 is mounted to an axle 24 which extends the whole width of the enclosure 1 and rotates in bearings 25, 25'. The lower pulley wheel 23 is mounted on an axle 26 which rotates on bearings 27, 27'. The partition 8 may be for example of sheet steel. The axle 26 is attached to a pulley wheel 29 connected by a belt or chain to a second pulley wheel 30 connected to a motor 31 via a reduction gear unit 32 so that the axle 26 rotates at the appropriate slow speed.

Spray nozzles 34 project through the sides of the enclosure 1 in the vicinity of each window or opening 2, 2' so as to cool a shoe after it reaches the end of the hot air treatment and approaches the opening. The nozzles may be of the type sold as Watford Setup G83 and available from The Aerospray Association. These nozzles form a part of a spray gun unit operating at the low air pressure of 7½ lbs per square inch and produce a very fine mist spray which is easily controlled. The nozzles are positioned to cool the maximum area of the upper face. In operation very little liquid moisture is formed on the uppers when the guns are correctly adjusted. Three nozzles are used adjacent each opening 2, arranged in an inverted triangle in two horizontal rows as shown particularly in FIG. 4. The upper nozzles are positioned about six inches apart on the front or window side of the partition 8. The lower central nozzle is about 8 inches below the others and the nozzles are about 16 inches from the support pin 18 (FIG. 4). They have a total spray angle of 60°. Each nozzle has separate adjustment valve 35 and a central pressure control 36 is provided for the whole water circuit.

Figure 6:
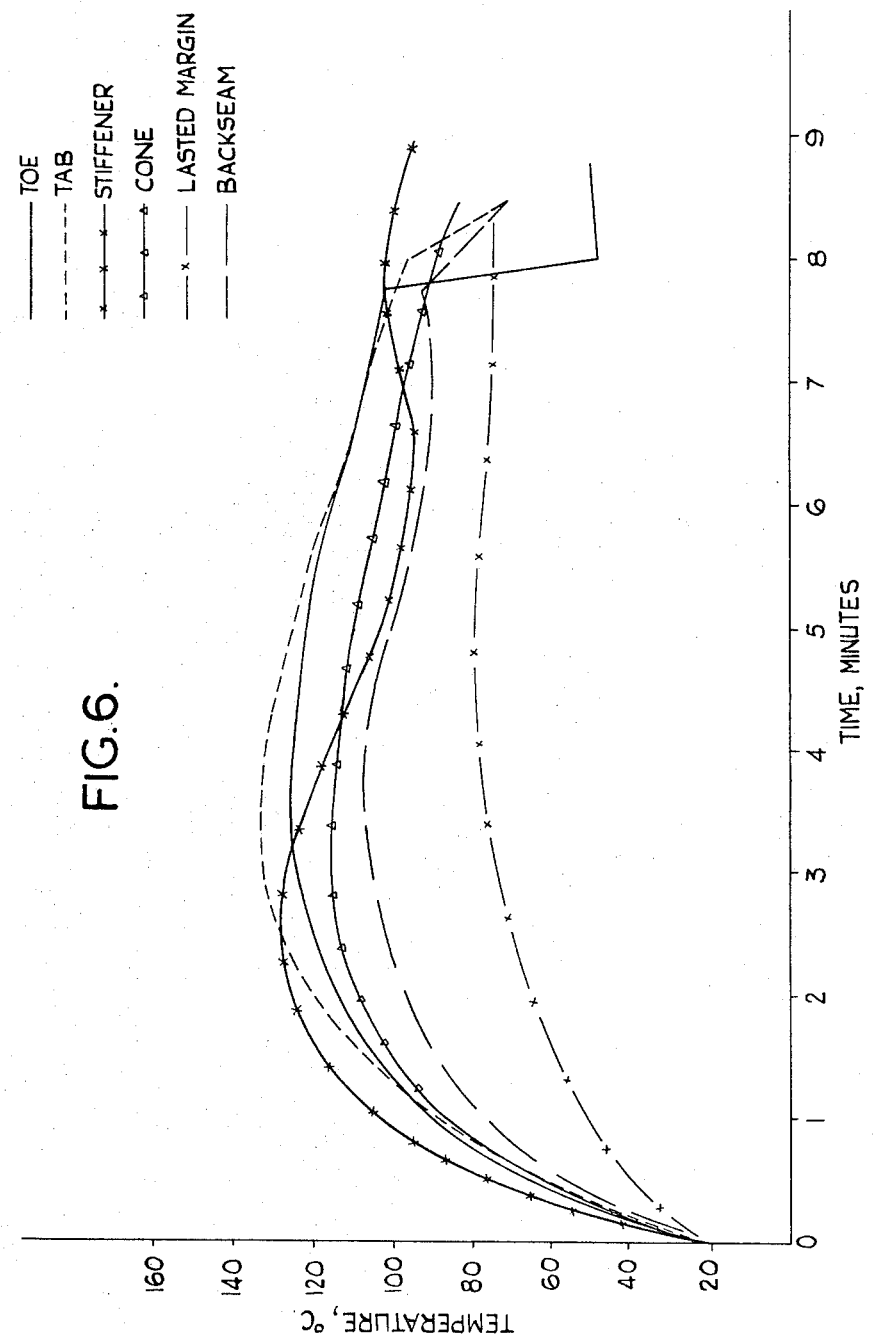
FIG. 6 is a time-temperature graph showing the temperatures to which various parts of a shoe are subjected during the process cycle.

FIG. 6 shows the temperature of the various parts of the size 7 shoe which has passed through the apparatus, the various lines referring to the toe, the tab at the heel of the shoe, the stiffener (between the outer and lining at the heel), the cone, the lasted margin and the back seam. The various temperatures were obtained with thermocouples.

The temperature curves clearly indicate the problems involved when an irregular surface is heated by radiant heat. Some parts of the shoe are hotter than others. The highest temperature recorded is 134°C at the tab point, closely followed by the temperature at the stiffener. A temperature of only 78°C was recorded in the lasting cement and most commercial lasting cements will easily withstand this temperature. The highest temperature recorded is well below the damage point or critical temperature of most poromeric materials but the thermocouples were positioned below the surface and actual surface temperatures were higher. Furthermore, larger sized shoes will obviously approach the radiant heaters more closely so that higher temperatures may be expected. Clelsea boots manufactured from Porvair material have been successfully treated by the apparatus described in the drawings.

After 8 minutes heating all parts of the upper were in the temperature range 90°C to 100°C, thus making the shoe too hot to handle and liable to damage by touching. The water spray rapidly reduced the temperature; at the toe for example the temperature was brought down to 50°C and other parts were brought down to about 70°C. In practice the shoes were comfortable to handle.

In the following table are given the results upon a number of poromeric materials subjected to treatment in the described apparatus, and as measured by the Satra Dome Plasticity Apparatus fully described in the Journal of the British Boot and Shoe Institution, Volume 10, Number 4 (July 1962) pages 133–142. The moist heat-setting cycle consisted of 1½ minutes steam at 65°C followed by 3½ minutes hot air at 120°C and the radiant heat setting cycle of 3½ minutes radiant heat producing a surface temperature of 160°C, 4 minutes hot gas and finally 1½ minutes water spray.

TABLE 1

| Material | Percentage set after one week | |
|---|---|---|
| | Standard Moist Heat Setting | Satra Radiant Heat Setting |
| Xylee | 50 | 69 |
| Corfam | 61 | 81 |
| Ortix | 38 | 55 |
| Hi-Telac | 72 | 84 |
| Patora | 42 | 69 |
| Porvair | 40 | 64 |
| Clarino | 49 | 61 |

The results of further experiments are given in Table 2 below. In these experiments the heat-setting was tested after various periods; the initial period refers to shoes immediately removed from the last. The Table shows the importance of using one week percentage set figures. Very high initial percentage set figures can be obtained on all the poromeric materials tried but considerable recovery takes place after one week. The sets are, however, much higher than can be obtained using normal moist-heat setting conditions. Furthermore the Dome Plasticity Apparatus used introduces cooling effects so that even the lowest set appearing in the Table provides an acceptable level for shoe-making.

TABLE 2

| Material | Percentage set | | | |
|---|---|---|---|---|
| | Initial | 1 hour | 24 hours | 1 week |
| Xylee | 92.5 | 79.3 | 73.1 | 64.0 |
| Corfam | 92.0 | 85.4 | 82.9 | 79.8 |
| Ortix | 85.5 | 74.6 | 62.1 | 54.0 |
| Hi-Telac | 94.1 | 91.3 | 88.8 | 80.2 |
| Patora | 90.7 | 82.0 | 73.3 | 65.8 |
| Porvair | 81.2 | 74.9 | 70.4 | 64.6 |
| Clarino | 85.5 | 73.2 | 66.6 | 57.0 |

While the poromeric material is preferably maintained in shape on a shoe last, it may be maintained in shape by means of a female mould derived from a shoe last, a part shoe last, a part female mould derived from a shoe last, and a male or female mould affording a moulding surface as claimed or described in Belgian Patent 745132.

What I claim is:

1. A method of heat setting shaped components of footwear composed of polyurethane-based poromeric shoe upper material in which said components are subjected to a continuous treatment cycle comprising:
   a. subjecting the shoe upper material to a radiant heat treatment in which the components are brought to a maximum temperature of 130°C to 160°C in 3 to 4 minutes,
   b. then subjecting the so-heated shoe upper material to a second heat treatment in which heating of the components is continued in a hot gas atmosphere at 80°C to 150°C for 3 to 5 minutes, and
   c. forced cooling by subjection to a coolant fluid selected from the group consisting of air and water spray, for up to 1 ½ minutes.

2. A method as claimed in claim 1 wherein the forced cooling is caried out with a stream of air and water spray having a velocity of at least 5 ft./sec.

3. A method as claimed in claim 1 wherein the total heating and cooling cycle does not exceed 8 minutes.

4. A method as claimed in claim 1 wherein the heat treatment is of sufficient intensity and duration to bring the surface temperature of the poromeric material to a temperature approaching but not substantially exceeding the critical temperature of the poromeric material and wherein the hot gas is at a temperature less than the critical temperature of the poromeric material.

5. A method as claimed in claim 1 wherein the article is subjected to radiant heating for 3½ minutes, to hot air for 4 minutes and to forced air cooling for one-half minute.

6. A method as claimed in claim 1 wherein the components are carried in succession past a plurality of radiant heat sources, through an enclosure containing hot air and past a jet emitting a spray of cold air and water.

7. A method as claimed in claim 6 wherein the air in the enclosure is heated by the radiant heat sources.

* * * * *